United States Patent [19]

Kato et al.

[11] Patent Number: 4,536,807

[45] Date of Patent: Aug. 20, 1985

[54] DISPLAY DEVICE FOR A MAGNETIC TAPE RECORDING AND/OR REPRODUCING APPARATUS

[75] Inventors: Hiroshi Kato, Chigasaki; Hiromitsu Kubota, Kawasaki, both of Japan

[73] Assignee: Victor Company of Japan, Ltd., Yokohama, Japan

[21] Appl. No.: 545,759

[22] Filed: Oct. 26, 1983

[30] Foreign Application Priority Data

Nov. 1, 1982 [JP] Japan .................. 57-192258
Nov. 1, 1982 [JP] Japan .................. 57-192260

[51] Int. Cl.³ .............................................. G11B 27/14
[52] U.S. Cl. .................................................. 360/72.3
[58] Field of Search .................. 360/71, 72.3, 74.5, 360/74.6, 137

[56] References Cited

FOREIGN PATENT DOCUMENTS 0364176 9/1981 Austria .
1929778 12/1965 Fed. Rep. of Germany .
2906481 8/1979 Fed. Rep. of Germany .
1235956 6/1971 United Kingdom .
1505631 3/1978 United Kingdom .

*Primary Examiner*—George G. Stellar
*Attorney, Agent, or Firm*—Louis Bernat

[57] ABSTRACT

A display device for a magnetic tape recording and/or reproducing apparatus, comprises a pulse generating circuit for generating a pulse signal having a frequency which is in accordance with a rotational speed of a capstan which drives a magnetic tape to travel in a state where the magnetic tape is pinched between the capstan and a pinch roller, a counter for counting the pulse signal from the pulse generating circuit, and an indicator for displaying a counted result in the counter. The counter counts the pulse signal from the pulse generating circuit so as to obtain a counted result which would result in a real-time display on the indicator. The indicator displays in real-time, a tape travel quantity of the magnetic tape which is driven to travel by the capstan.

8 Claims, 6 Drawing Figures

DISPLAY DEVICE FOR A MAGNETIC TAPE RECORDING AND/OR REPRODUCING APPARATUS

BACKGROUND OF THE INVENTION

The present invention generally relates to display devices for magnetic tape recording and/or reproducing apparatuses which record and/or reproduce a signal onto and/or from a traveling magnetic tape, and more particularly to a display device which is designed to display a travel quantity of the magnetic tape in real-time.

Conventionally, as systems for displaying the travel quantity of a magnetic tape in a recording and/or reproducing apparatus which employs the magnetic tape, such as a video tape recorder (VTR), there were the following three systems, for example. According to a first system, the rotations of reel discs are detected, and the display of the tape travel quantity is carried out according to the rotational speeds of the reel discs. According to a second system, a tape counting roller is provided exclusively for detecting the tape travel within a tape driving system, and the tape travel quantity is displayed by detecting the rotation of this tape counting roller. Further, according to a third system, the tape travel quantity is displayed by detecting a signal which has been recorded on the tape. However, in each of these conventional systems, there were the following disadvantages.

The first system detects the rotational speeds of both the reel discs. Detection signals indicative of the respective rotational speeds of the reel discs, are processed in a microprocessor and the like according to predetermined calculating equations, and the tape travel quantity is displayed in real-time. Thus the cost of the apparatus became high. Moreover, there was a disadvantage in that the predetermined calculating equations to which the processing of the detection signals is based, had to be changed according to the diameter of the reel hubs, and adjustments were consequentially required in the microprocessor and the like which carried out the processing.

The second system was disadvantageous in that the tape counting roller had to be provided in the tape driving system, exclusively for detecting the tape travel. Further, it was essential that there was no slippage between the tape and the tape counting roller, in order to provide an accurate display of the tape travel quantity. For this reason, the angular range over which the tape is wrapped around the tape counting roller, had to be large so as to prevent the slippage between the tape and the tape counting roller. However, this wrapping of the tape around the tape counting roller over a large angular range, reduced the degree of freedom with which the tape path can be designed. Further, the dimensions of the tape counting roller had to be exact, and the tape counting roller had to be assembled with high precision.

The application of the third system was quite limited, because this third system could not be employed in a case where the signal which is used for detecting the tape travel quantity was not recorded on the tape.

SUMMARY OF THE INVENTION

Accordingly, it is a general object of the present invention to provide a novel and useful display device for a magnetic tape recording and/or reproducing apparatus, in which the above described disadvantages have been overcome.

Another and more specific object of the present invention is to provide a display device for a magnetic tape recording and/or reproducing apparatus, which is designed to display the tape travel quantity in real-time, by counting a pulse signal from a frequency generator which is provided in relation to a capstan. According to the device of the present invention, the degree of freedom with which the tape path can be designed will not be limited as in the second conventional system described before which employs a tape counting roller, and it is unnecessary to carry out special signal processing as in the first conventional system described before which uses the rotations of the reel discs. The display of the tape travel quantity in real-time is facilitated according to the device of the present invention.

Still another object of the present invention is to provide a display device for a magnetic tape recording and/or reproducing apparatus, which is designed so that a pulse signal from a frequency generator is not counted when either one of transparent leader tape and trailer tape which are respectively connected to both ends of a magnetic tape is detected, to freeze the display. According to the device of the present invention, the real-time display is made only with respect to the tape travel quantity of the actual magnetic tape.

A further object of the present invention is to provide a display device for a magnetic tape recording and/or reproducing apparatus, which is designed so that the real-time display of the tape travel quantity can also be made during fast-forward and rewind modes of the apparatus, by keeping the tape pinched between a capstan and a pinch roller even during the fast-forward and rewind modes so that the fast-forwarding or rewinding of the tape is carried out by rotating the capstan in a forward direction or a reverse direction at a high speed.

Other objects and further features of the present invention will be apparent from the following detailed description when read in conjunction with the accompanying drawings.

DETAILED DESCRIPTION

Before a tape cassette 18 is loaded into a magnetic tape recording and/or reproducing apparatus 10, a loading arm 11 which is provided on the supply side and a loading arm 12 which is provided on the take-up side, are respectively located at positions rotated counterclockwise to their respective limits. The tape cassette 18 is a standard type tape cassette employing a ¾ inch magnetic tape 23. A loading pole 13 which is arranged at the free end of the loading arm 11, and a loading pole 14 which is arranged at the free end of the loading arm 12, are respectively located at positions indicated by two-dot chain lines in FIG. 1. A loading ring 16 which encircles a guide drum 15, is located at a position rotated counterclockwise A pinch roller 17 is located at a position shown in FIG. 2.

The tape cassette 18 is loaded into the apparatus 10 by fitting a supply reel 19 over a supply reel disc 21, and a take-up reel 20 over a take-up reel disc 22. When the tape cassette 18 is loaded into the apparatus 10, a microswitch 38 detects the loaded tape cassette 18, and the apparatus 10 automatically starts to carry out a predetermined operation, and video heads which are provided on the guide drum 15 begin to rotate. This predetermined operation comprises two stages of operations. During the first operation stage, the tape 23 is drawn out of the tape cassette 18 to a state shown in FIG. 2. Then, during the second operation stage subsequent to the first operation stage, the tape 23 is drawn around the guide drum 15 and is loaded to a state shown in FIG. 1, as will be described later on in the specification.

Figure 3:
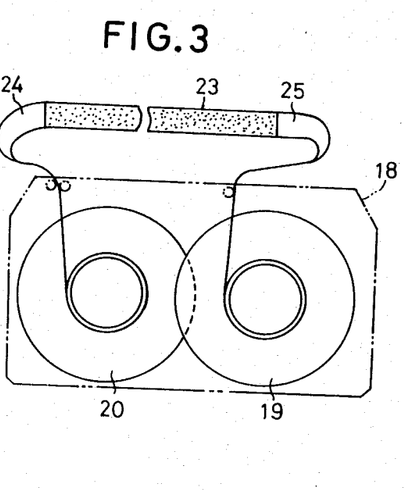
FIG. 3 shows a leader tape and a trailer tape which are respectively connected to a starting end and a terminal end of a magnetic tape within a tape cassette.

As shown in FIG. 3, the magnetic tape 23 within the tape cassette 18, has one end of a transparent leader tape 24 connected to a starting end of the tape 23. One end of a transparent trailer tape 25 is connected to a terminal end of the tape 23. The other end of the leader tape 24 is fixed to a hub of the take-up reel 20, and the other end of the trailer tape 25 is fixed to a hub of the supply reel 19.

Figure 1:
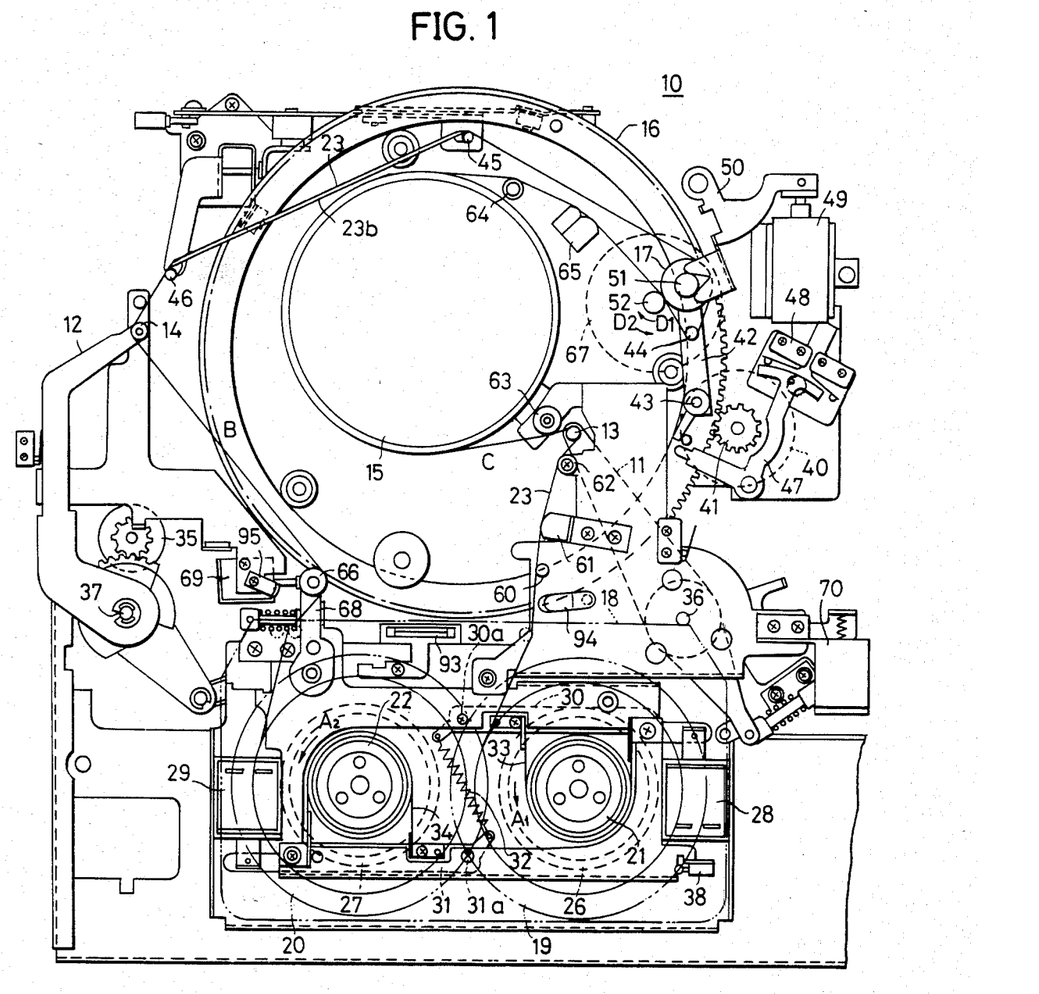
FIG. 1 is a plan view showing an example of a magnetic tape recording and/or reproducing apparatus which may be applied with a display device according to the present invention, in a state where the apparatus is in a reproducing mode (fast-forward mode, rewind mode)
Figure 2:
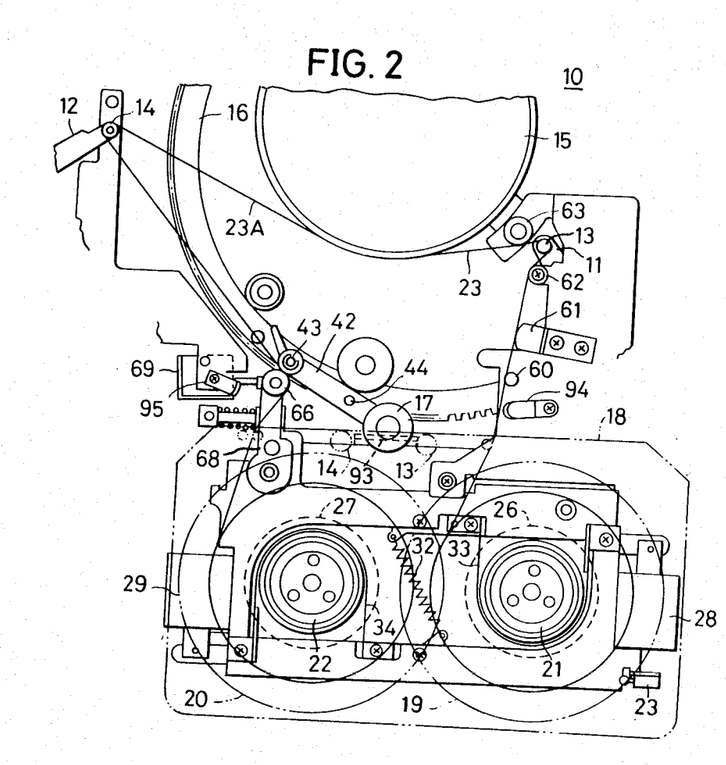
FIG. 2 is a plan view showing the apparatus shown in FIG. 1 in a state where the tape loading operation has progressed to an intermediate stage.

When starting the first operation stage described above in which the tape 23 is drawn out of the tape cassette 18, a predetermined low voltage is applied to a supply reel motor 26 and to a take-up reel motor 27. As a result, a tape take-up torque in the direction of an arrow $A_1$ in FIG. 1 is applied to the supply reel disc 21 which is directly coupled to the reel motor 26. A tape take-up torque in the direction of an arrow $A_2$ is applied to the take-up reel disc 22 which is directly coupled to the reel motor 27. The tape take-up torques applied to the reel discs 21 and 22, are substantially the same in magnitude.

In addition, a plunger 28 for releasing the braking action with respect to the reel disc 21, and a plunger 29 for releasing the braking action with respect to the reel disc 22, are respectively turned ON. Accordingly, a brake arm 30 rotates clockwise about a pin 30a against a force exerted by a spring 32, while a brake arm 31 also rotates clockwise about a pin 31a against the force exerted by the spring 32. Brake bands 33 and 34 are respectively slackened by the clockwise rotation of the brake arms 30 and 31. Thus, the braking actions with respect to the reel discs 21 and 22 are released, and in this state, the same take-up torque is applied to these reel discs 21 and 22.

A loading arm motor 35 is started in this state. When the motor 35 starts to rotate, the loading arm 11 rotates clockwise about a pin 36, and the loading arm 12 rotates counterclockwise about a pin 37. The loading arms 11 and 12 rotate up to final positions shown in FIGS.1 and 2. As the loading arms 11 and 12 rotate up to the final positions, these loading arms 11 and 12 intercept the tape 23 and draw out the tape 23 from the tape cassette 18. As a result, the tape 23 forms a tape path 23A in which a part of the tape 23 makes contact with the guide drum 15, and the first operation stage is completed.

Next, continuing to the first operation stage, the apparatus 10 carries out the second operation stage in which the tape 23 is drawn around the guide drum 15. When a loading motor 40 starts to rotate, the loading ring 16 is driven by a gear 41 and is rotated clockwise. A pinch roller arm 42 is pivotally supported on the loading ring 16 by a pin 43. A return roller 44 and the pinch roller 17, are respectively provided on the arm 42. As the loading ring 16 rotates, the tape 23 forming the tape path 23A is intercepted by the return roller 44 and is drawn around the periphery of the guide drum 15 so that the tape 23 makes contact with the peripheral surface of the guide drum 15. The loading ring 16 rotates by approximately ¾ revolution, and guide poles 45 and 46 are respectively raised as the loading ring 16 rotates.

When the loading ring 16 reaches the final position shown in FIG. 1, an L-shaped detecting arm 47 rotates, and a detection switch 48 which detects the end of the tape loading operation is turned ON. When the detection switch 48 is turned ON, the loading motor 40 stops and a plunger 49 is turned ON. When the plunger 49 is turned ON, an arm 50 rotates clockwise, and a pin 51 of the pinch roller 17 is pushed by a V-shaped groove in the arm 50. Accordingly, the pinch roller 17 is pressed against a capstan 52.

A tape path 23B shown in FIG. 1 is formed when the loading operation is completed in this manner. In the tape path 23B, the tape 23 is drawn out from the supply reel 19 within the tape cassette 18, and is guided by a guide pole 60. Then, the tape 23 makes contact with an erasing and time code recording and reproducing head 61, and is guided by a guide pole 62 and the loading pole 13. The tape 23 is thereafter wrapped around the peripheral surface of the guide drum 15 in a spiral manner, over a predetermined angular range which is determined by guide poles 63 and 64. Further, the tape 23 makes contact with an audio and control head 65, and is pinched between the capstan 52 and the pinch roller 17. The traveling direction of the tape 23 is changed by substantially 180° by the return roller 44, and the tape 23 is then guided by the guide poles 46 and 45. The tape 23 is guided by the loading pole 14 and a guide roller 66, before finally reaching the take-up reel 20 within the tape cassette 18.

In the above state, a capstan motor 67 remains stopped. Thus, although the tape 23 is pinched between the capstan 52 and the pinch roller 17, the tape 23 does not travel. In this state, the apparatus 10 is in a stop mode.

In the above stop mode of the apparatus 10, a first control mechanism which controls the tape tension on the tape take-up side is made operative. This first control mechanism comprises a tension arm 68 which has the guide roller 66 provided on the tip end thereof, and a differential transformer 69 which detects the rotational position of the arm 68 and varies the voltage which is applied to the take-up reel motor 27. In addition, a second control mechanism which controls the tape tension on the tape supply side, is also made operative in the stop mode of the apparatus 10. This second control mechanism comprises the loading arm 11 which functions as a tension arm, and a differential transformer 70. Accordingly, in the stop mode of the apparatus 10, the values of the tape tensions at positions B and C in the tape path 23B are respectively controlled to a reference value.

Next, description will be given with respect to the operation of an essential part of the display device according to the present invention, by referring to FIGS. 4 through 6.

The control of the apparatus 10 when the tape loading operation is completed, and the control of the apparatus 10 when the tape 23 is traveling, are respectively carried out by a control circuit 80 which comprises a microcomputer.

Figure 6:
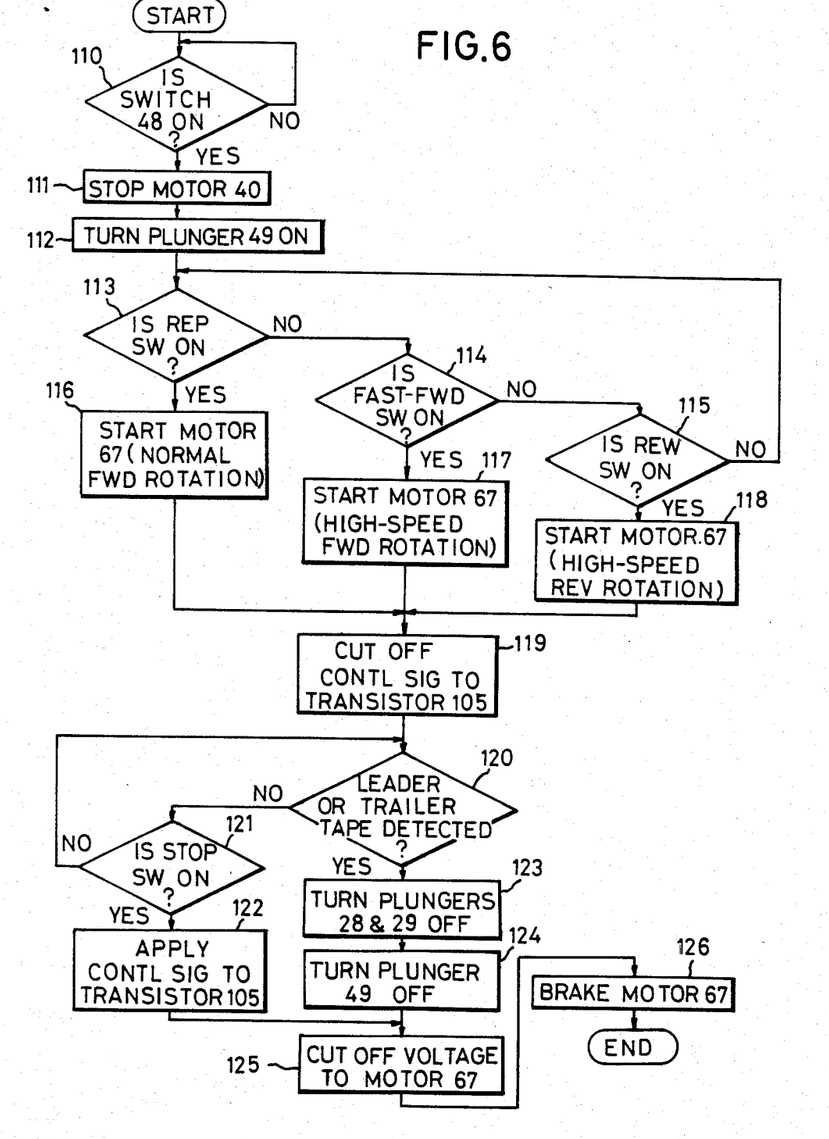
FIG. 6 is a flowchart for explaining the operation of a control circuit shown in FIG. 5.

FIG. 6 is a flowchart showing the operation of the control circuit 80. The tape loading operation is carried out after the operation of the control circuit 80 is started, however, the steps involved in the tape loading operation are omitted in FIG. 6. The control circuit 80 discriminates whether the tape loading operation has been completed, by discriminating whether the detection switch 48 is ON in a step 110. In the description hereinafter, the steps referred to are steps in the flowchart shown in FIG. 6. When the discrimination result in the step 110 is "YES", the control circuit 80 stops the loading ring motor 40 in a step 111. In a subsequent step 112, the control circuit 80 supplies a signal to a plunger driving circuit 81, to turn the plunger 49 ON. In this state, the tape loading operation is completed, and the apparatus 10 assumes the stop mode.

Next, the control circuit 80 discriminates whether a reproduction switch (not shown) is ON in a step 113. If the discrimination result in the step 113 is "NO", the control circuit 80 goes on to discriminate whether a fast-forward switch (not shown) is ON in a step 114. If the discrimination result in the step 114 is "NO", the control circuit 80 discriminates whether a rewind switch (not shown) is ON in a step 115. The operation of the control circuit 80 returns to the step 113 if the discrimination result in the step 115 is "NO".

When the reproducing switch is turned ON and the discrimination result in the step 113 becomes "YES", the control circuit 80 produces a signal through a terminal 82a in a step 116. This signal which is produced through the terminal 82a, is applied to a motor driving amplifier 83 through a terminal 82b shown in FIG. 4. When this signal is applied to the motor driving amplifier 83, the capstan motor 67 starts to rotate, and the capstan 52 rotates in the direction of an arrow $D_1$ in FIG. 1. As a result, the tape 23 is driven in a state where the tape 23 is pinched between the capstan 52 and the pinch roller 17, and the tape 23 begins to travel in a forward direction.

A phase comparator 85 compares the phase of a control signal which is reproduced from the tape 23 by the audio and control head 65, and the phase of a synchronizing signal which is separated from a reproduced video signal which is obtained through a terminal 84. An output signal of this phase comparator 85 is supplied to a mixing amplifier 88, through a switch $SW_1$. On the other hand, a signal from a frequency generator 86 which is provided on the capstan motor 67, is supplied to a frequency-to-voltage (F/V) converter 87. An output signal of the F/V converter 87 is supplied to the mixing amplifier 88 through a switch $SW_2$. The two signals thus supplied to the mixing amplifier 88, are respectively mixed and amplified in the mixing amplifier 88. An output signal of this mixing amplifier 88 is applied to the motor driving amplifier 83, and as a result, the capstan motor 67 is rotated at a normal speed.

Accordingly, the tape 23 is driven to travel in the forward direction at a normal speed.

Before the tape 23 begins to travel, the tension in the tape 23 assumes a value which is expected when the tape 23 travels, as described before. Therefore, the tape 23 can begin to travel stably, without accompanying a great change in the tape tension. For this reason, the mode of the apparatus 10 can be changed smoothly to the recording or reproduction mode, from the stop mode.

When the fast-forward switch is turned ON and the discrimination result in the step 114 becomes "YES", the control circuit 80 produces signals through the terminal 82a and a terminal 89a in a step 117. The signal produced through the terminal 89a, is supplied to an inverter 90 and to a switch $SW_3$, through a terminal 89b shown in FIG. 4. An output signal of the inverter 90 is supplied to the switches $SW_1$ and $SW_2$ to open these switches $SW_1$ and $SW_2$. On the other hand, the output signal of the inverter 90 is also supplied to a switch $SW_4$, to close this switch $SW_4$. Accordingly, a voltage for causing the tape 23 to undergo a high-speed travel, is applied to the mixing amplifier 88, through a terminal 91 and the switch $SW_3$. Thus, a voltage which is higher than the voltage obtained when the tape 23 is caused to undergo a normal-speed tape travel, is produced from the motor driving amplifier 83. Therefore, the capstan motor 67 rotates in the direction of the arrow $D_1$ at a high speed. The plunger 49 remains ON, and the pinch roller 17 remains pressed against the capstan 52. Hence, the tape 23 is driven in the state where the tape 23 is pinched between the pinch roller 17 and the capstan 52, and the tape 23 travels in the forward direction at a high speed, along the tape path 23B. In this state, the apparatus 10 is in a fast-forward mode.

When the rewind switch is turned ON, the discrimination result in the step 115 becomes "YES", and the control circuit 80 produces signals through the terminals 82a and 89a in a step 118. Thus, as in the case described above, the switches $SW_1$ and $SW_2$ open, and the switch $SW_3$ closes. Moreover, a high voltage of an opposite polarity is produced from the capstan motor driving amplifier 83 and applied to the motor 67, to rotate the capstan motor 67 in the direction of an arrow $D_2$ in FIG. 1 at a high speed. The plunger 49 remains ON, and the pinch roller 17 remains pressed against the capstan 52. Accordingly, the tape 23 is driven in the state pinched between the pinch roller 17 and the capstan 52, and the tape 23 travels in a reverse direction at a high speed, along the tape path 23B. In this state, the apparatus is in a rewind mode.

During each of the recording, reproducing, and fast-forward modes of the apparatus 10 described heretofore, the tape 23 is drawn out from the supply reel 19 in a state where the tape tension at a position C is controlled by the supply reel motor 26, and the tape 23 is taken up by the take-up reel 20 in a state where the tape tension at the position B is controlled by the take-up reel motor 27. And, during the rewind mode of the apparatus 10, the tape 23 is drawn out from the take-up reel 20 in a state where the tape tension at the position B is controlled by the take-up reel motor 27, and the tape 23 is taken up by the supply reel 19 at a high speed in a state where the tape tension at the position C is controlled by the supply reel motor 26.

In addition, during the fast-forward and rewind modes of the apparatus 10, the motor driving amplifier 83 operates so as to gradually apply the voltage to the capstan motor 67. Thus, the capstan motor 67 undergoes the known so-called slow-start, so that the rotational speed of the motor 67 increases gradually. For this reason, there is virtually no slippage between the tape 23 and the pinch roller 17 and the capstan 52 which drive the tape 23. Moreover, the tape 23 begins to travel without accompanying a great change in the tape tension, that is, without accompanying even an instantaneous change which is large.

Figure 4:
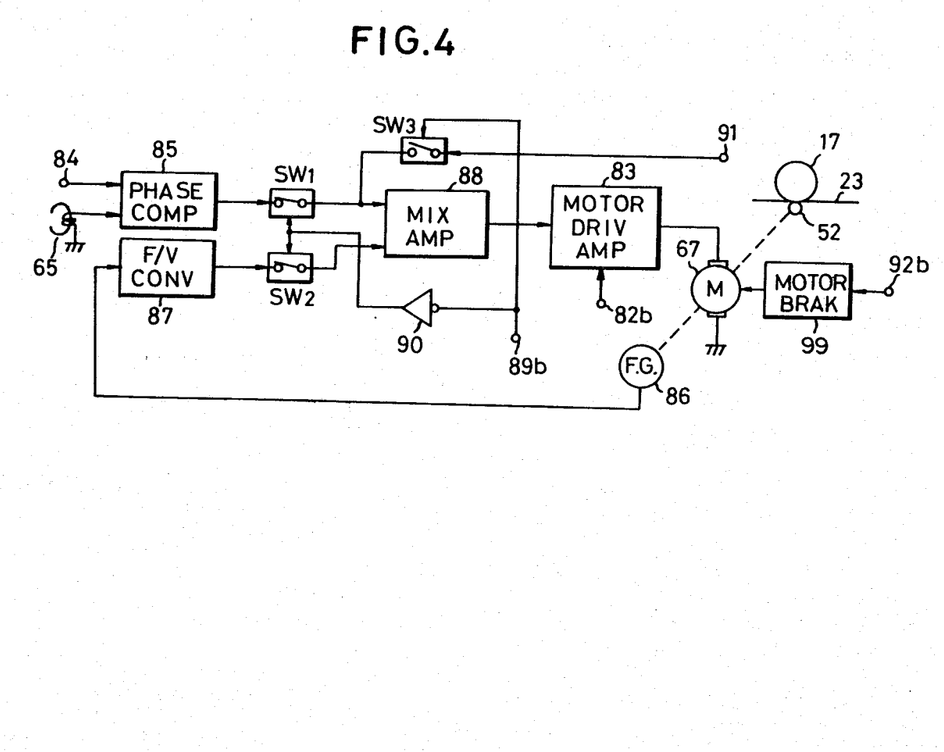
FIG. 4 is a block diagram showing a capstan motor control circuit which is used in the apparatus shown in FIG. 1.
Figure 5:
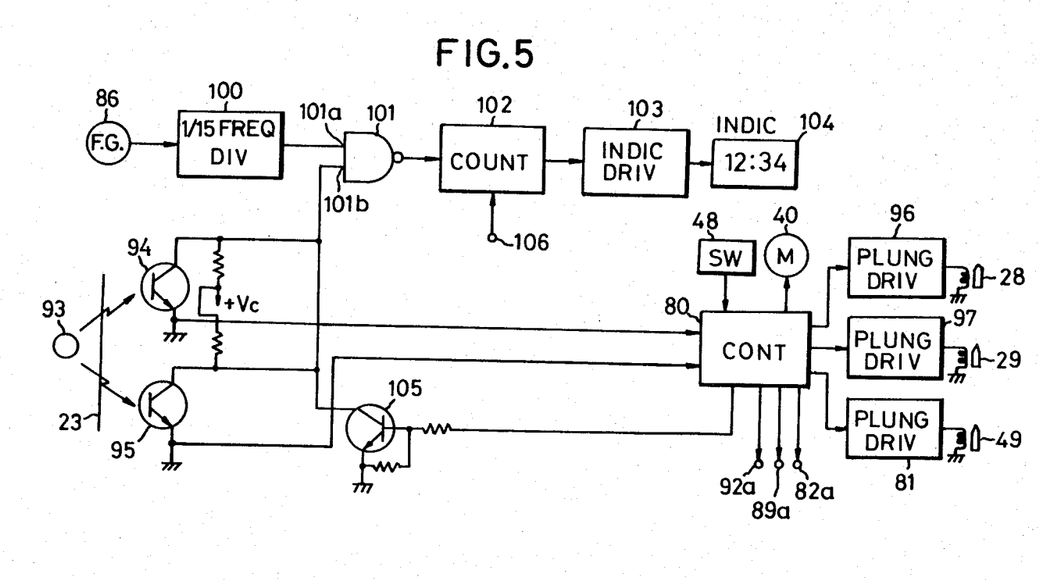
FIG. 5 is a block diagram showing an embodiment of a display device according to the present invention.

Next, the control circuit 80 cuts off the supply of a switching control signal to a transistor 105 shown in FIG. 5, in a step 119. In a step 120, the control circuit 80 discriminates whether the leader tape 24 or the trailer tape 25 has been detected by use of phototransistors 96 and 97. While the tape 23 is traveling across the phototransistors 96 and 97, the discrimination result in the step 120 is "NO". When the discrimination result in the step 120 is "NO", the control circuit 80 discriminates whether a stop switch (not shown) is ON in a step 121. If the stop switch is turned ON so as to put the apparatus 10 in the stop mode and the discrimination result in the step 121 becomes "YES", the control circuit 80 supplies the switching control signal to the transistor 105 in a step 122. The control circuit 80 then cuts off the voltage to the capstan motor 67 in a step 125, and produces a signal through a terminal 92a in a step 126. This signal which is produced through the terminal 92a, is applied to a motor braking circuit 83 through a terminal 92b shown in FIG. 4, to operate the braking circuit 83. Accordingly, the capstan motor 67 is braked and stops rotating. Hence, the tape 23 in the tape path 23B stops traveling in the state where the tape 23 is pinched between the pinch roller 17 and the capstan 52 and where the tape tensions at the positions B and C are respectively controlled.

Therefore, the tape tension is stably controlled while the tape 23 travels, so that the tape 23 is stably taken up by one of the reels. And, in addition, the tape tension is also controlled so that the change in the tape tension is extremely small and the tape 23 is stably taken up by one of the reels, during a period in which the tape 23 begins to travel from the stopped state and reaches the intended tape speed, and during a period in which the tape 23 finally stops traveling from the state where the tape 23 is traveling at the intended speed.

On the other hand, if the fast-forward mode is continued and all of the tape 23 is drawn out from the supply reel 19, and the trailer tape 25 is drawn outside the tape cassette 18, the phototransistor 94 receives the light which is emitted from a lamp 93 and has passed through the transparent trailer tape 25. The phototransistor 94 is thus turned ON, and it is detected that the trailer tape 25 has been drawn outside the tape cassette 18. The control circuit 80 discriminates the result of this detection, that is, whether the trailer tape 25 (or the leader tape 24) has been drawn outside the tape cassette 18, in the step 120. When the discrimination result in the step 120 becomes "YES", the control circuit 80 makes the plunger driving circuits 96 and 97 inoperative in a step 123. Accordingly, the plungers 28 and 29 are respectively turned OFF, and the supply reel disc 21 and the take-up reel disc 22 are respectively braked simultaneously. In addition, the control circuit 80 makes the plunger driving circuit 81 inoperative in a step 124. Thus, the plunger 49 is turned OFF, and the arm 50 rotates counterclockwise. As a result, the pinch roller 17 separates from the capstan 52. Furthermore, as in the case where the stop switch is turned ON, the control circuit 80 cuts off the voltage to the capstan motor 67 in the step 125, and brakes the capstan motor 67 in the step 126.

Accordingly, the tape 23 is no longer driven in the state where the tape 23 is pinched between the capstan 52 and the pinch roller 17, and the reel discs 21 and 22 are respectively braked. Hence, the tape 23 stops traveling within an exceedingly short period of time, and the trailer tape 25 positively stops traveling before reaching the peripheral surface of the guide drum 15. Therefore, the rotating video heads will not scan over a joint between the magnetic tape 23 and the trailer tape 25. The video heads will thus be prevented from becoming damaged due to unwanted scan over the joint in the tape. If the pinch roller 17 is kept pressed against the capstan 52, an excessively large tension will be introduced in the tape 23 because the reel discs 21 and 22 will stop rotating before the capstan 52 stops rotating. However, in the present embodiment, the capstan 52 will stop driving the tape 23 immediately since the pinch roller 17 separates from the capstan 52. For this reason, the fact that the capstan 52 stops rotating after the reel discs 21 and 22, will have no effect on the tape tension. In other words, the tape 23 will stop traveling without introducing an excessively large tension in the tape 23.

When the rewind mode of the apparatus 10 is continued and the leader tape 24 is drawn outside the tape cassette 18, the phototransistor 95 detects that the leader tape 24 has been reached. Thus, the control circuit 80 carries out the steps 120, 123, 124, 125, and 126 as in the case described before, and the tape 23 stops traveling instantly.

Next, description will be given with respect to the display system which displays the tape travel quantity in real-time and forms an essential part of the display device according to the present invention, by referring particularly to FIG. 5.

The frequency generator 86 is designed to produce a pulse signal having a frequency of 450 Hz during the normal recording or reproducing mode. The pulse signal from the frequency generator 86 is formed into a pulse signal having a frequency of 30 Hz in a 1/15-frequency divider 100. This pulse signal having the frequency of 30 Hz is more suited for the real-time display. This output pulse signal of the frequency divider 100 is applied to one input terminal 101a of a NAND gate 101. The other input terminal 101b of the NAND gate 101, is coupled to the collectors of the phototransistors 94 and 95 which respectively have their emitters grounded, and to the collector of the transistor 105 which also has its emitter grounded. The input terminal 101b is also coupled to a power source which produces a voltage $+V_c$. While the tape detecting means is detecting the magnetic tape 23, the phototransistors 94 and 95 do not receive the light emitted by the lamp 93, and the phototransistors 94 and 95 are both OFF. The ON and OFF states of the transistor 105 are controlled by the control circuit 80. A signal is applied to the base of this transistor 105 during the stop mode of the apparatus 10, and this transistor 105 is ON during the stop mode. The input terminal 101b of the NAND gate 101 is grounded, and the signal level at the input terminal 101b is low during the stop mode of the apparatus 10.

When the reproducing switch, fast-forward switch, or the rewind switch is turned ON during the stop mode of the apparatus 10, the control circuit 80 cuts off the supply of the signal to the base of the transistor 105 in the step 119. As a result, the transistor 105 is turned OFF, and a voltage $+V_c$ is applied to the input terminal 101b of the NAND gate 101 because the phototransistors 94 and 95 are OFF in this state. Hence, the signal level at the input terminal 101b becomes high. The NAND gate 101 produces a pulse signal which has an inverted pulse form of the input pulse signal applied to the input terminal 101a. This output pulse signal of the NAND gate 101 is counted in a counter 102. A signal which is in accordance with the traveling direction of the tape 23 is applied to the counter 102, to control the count-up and count-down operations in the counter 102. The counter 102 counts up the pulse signal from the NAND gate 101 when the tape 23 is traveling in the forward direction, and counts down the pulse signal from the counter 102 when the tape 23 is traveling in the reverse direction (rewinding direction). An output signal of the counter 102, which is indicative of the counted value, is applied to an indicator driving circuit 103 which produces an output signal for driving an indicator 104. This indicator 104 displays the tape travel quantity in real-time. The tape travel quantity in real-time, is a time it would take for the tape 23 to travel over the same distance with the tape speed which is employed during the normal recording or reproducing mode. In FIG. 5, "12 minutes and 34 seconds" is displayed on the indicator 104. During the fast-forward and rewind modes of the apparatus 10, the capstan motor 67 rotates at a high speed as described before. Thus, in the fast-forward and rewind modes, the frequency generator 86 generates a pulse signal having a frequency which is higher than the frequency of 450 Hz described previously. The indicator 104 similarly displays the tape travel quantity in real-time during these fast-forward and rewind modes.

While the tape 23 travels, a very slight slippage occurs between the capstan 52 and the tape 23, and the number of rotations of the capstan 52 and the distance over which the tape 23 travels do not perfectly correspond. However, because the slippage is exceedingly small and therefore negligible, no problems will be introduced. As described before, the capstan motor 67 carries out the slow-start during the fast-forward and rewind modes. Thus, the slippage between the tape 23 and the capstan 52 is exceedingly small in these fast-forward and rewind modes, and the display of the tape travel quantity in real-time is also accurate in these modes.

When the stop switch is turned ON while the apparatus 10 is in any one of the modes described heretofore, the control circuit 80 supplies a signal to the transistor 105 in the step 122. Accordingly, the transistor 105 is turned ON, and the input terminal 101b of the NAND gate 101 becomes grounded through the transistor 105. That is, the signal level at the input terminal 101b becomes low. Hence, the output signal level of the NAND gate 101 is kept high, regardless of whether the signal level at the input terminal 101a is high or low. For this reason, the supply of the pulse signal to the counter 102 is cut off when the transistor 105 becomes ON, and the counter 102 stops counting. Therefore, the displayed value on the indicator 104 is frozen, because the counted value which is indicated by the output signal of the counter 102 does not change after the tape 23 stops traveling. On the other hand, as described before, the capstan motor 67 is braked electrically and stops rotating within a short period of time when the stop operation is carried out. Accordingly, the tape 23 stops traveling substantially at the same time as when the display on the indicator 104 becomes frozen, and there is essentially no difference between the displayed tape travel quantity and the actual tape travel quantity. That is, the difference between the displayed tape travel quantity and the actual tape travel quantity, which will be introduced if the capstan motor 67 continues to rotate due to inertia after the stop operation is carried out, would not be introduced according to the apparatus 10.

When the tape 23 travels in the forward direction and the end of the tape 23 is reached, the trailer tape 25 is drawn outside the tape cassette 18. In this case, the phototransistor 94 receives the light which is emitted from the lamp 93 and has passed through the trailer tape 25, and is turned ON. Accordingly, the input terminal 101b of the NAND gate 101 is grounded through the phototransistor 94, and the signal level at the input terminal 101b becomes low. Thus, as in the case described before, the signal level at the output of the NAND gate 101 remains high regardless of whether the signal level at the input terminal 101a is high or low. For this reason, when the signal level at the input terminal 101b of the NAND gate 101 becomes low, no pulse signal is obtained at the output of the NAND gate 101 even when the pulse signal from the frequency divider 100 is applied to the other input terminal 101a. Hence, the supply of the pulse signal to the counter 102 is cut off, and the counter 102 stops the counting operation at this point. The display on the indicator 104 is frozen in this state.

On the other hand, when the tape 23 travels in the reverse direction at the end of the tape 23 is reached, the leader tape 24 is drawn outside the tape cassette 18. In this case, the phototransistor 95 receives the light which is emitted from the lamp 93 and has passed through the leader tape 24, and is turned ON. Accordingly, the input terminal 101b of the NAND gate 101 is grounded through the phototransistor 95, and the signal level at the input terminal 101b becomes low. As a result, the NAND gate 101 produces no pulse signal even when a pulse signal is applied to the other input terminal 101a. Hence, the supply of the pulse signal to the counter 102 is cut off, and the display on the indicator 104 is frozed in this state.

As already described previously, the tape 23 stops traveling instantly when the detecting means detects the trailer tape 25 or the leader tape 24. However, it takes a certain time until the capstan motor 67 stops rotating. Thus, the capstan motor 67 stops rotating slightly after the tape 23 stops traveling. Therefore, if the counter 102 continues counting until the capstan motor 67 is braked and stops rotating, the display of the tape travel quantity becomes larger than the actual tape travel quantity. That is, a difference which cannot be ignored, is introduced between the displayed tape travel quantity and the actual tape travel quantity. The present embodiment is designed so that the supply of the pulse signal to the counter 102 is cut off at the point when the detecting means detects the trailer tape 25 or the leader tape 24. Thus, according to the present embodiment, there will be no error in the display of the tape travel quantity due to the late stopping of the capstan motor 67, and the indicator 104 accurately displays a value which corresponds to the actual tape travel quantity of the tape 23.

When the trailer tape 25 is taken up by the supply reel 19 or the leader tape 24 is taken up by the take-up reel 20, and the trailer tape 25 or the leader tape 24 moves past the position opposing the phototransistor 94 or 95, the magnetic tape 23 then comes to oppose the phototransistors 94 and 95. Hence, the light emitted from the lamp 93 will not reach the phototransistors 94 and 95, and these phototransistors 94 and 95 will be turned OFF. Therefore, the voltage $+V_c$ is again applied to the input terminal 101b, and the signal level at the input terminal 101b becomes high. Accordingly, the pulse signal which has the inverted form of the pulse signal applied to the input terminal 101a, is produced from the NAND gate 101. This pulse signal produced from the NAND gate 101 is supplied to the counter 102. The counter 102 starts to count again, and the displayed value on the indicator 104 changes.

According to the present embodiment, it is possible to carry out the real-time display of the tape travel quantity without being limited of the degree of freedom with which the tape path can be designed as in the case where the tape counting roller is used to detect the tape travel quantity. Moreover, there is no need to carry out special signal processing as in the case where the rotations of the reel discs are used to detect the tape travel quantity.

In addition, during a reproduction mode in the reverse direction, the capstan motor 67 rotates in the reverse direction. Further, the capstan motor 67 rotates at a speed in accordance with the mode, during special reproduction modes such as a 1/30-speed reproduction mode and a 5-times speed reproduction mode. The tape 23 is also driven by the capstan 52 in the state where the tape 23 is pinched between the pinch roller 17 and the capstan 52 during each of these modes, and the real-time display of the tape travel quantity is carried out similarly as described before.

As shown in FIGS.1 and 4, the frequency generator 86 is integrally built into the capstan motor 67. The output signal of the frequency generator 86 is commonly used for two purposes, that is, for capstan servo and for display of the tape travel quantity. Furthermore, the capstan 52 is fixed to the rotary shaft of the capstan motor 67, and there is essentially no slippage in the rotation transmitting mechanism which would otherwise be introduced if the capstan motor 67 and the capstan 52 are coupled by a belt, for example. Therefore, the real-time display of the tape traveling quantity is also accurate from this point of view.

When the stop mode of the apparatus 10 continues over a predetermined period of time or the stop switch is turned ON twice, for example, the video heads of the guide drum 15 stop rotating, and the pinch roller 17 separates from the capstan 52. Moreover, the supply of voltages to the reel motors 26 and 27 are respectively cut off, and the reel discs 21 and 22 are respectively braked. Accordingly, the pinch roller 17 is prevented from becoming deformed due to contact with the capstan 52 for an excessively long period of time, and the video heads are prevented from wear due to friction between the tape 23.

In the apparatus 10 described heretofore, the capstan motor 67 will be braked and stopped as in the case where the stop switch is turned ON, when a pause switch (not shown) is turned ON during the recording or reproducing mode.

The plunger 49 is turned OFF when an ejecting operation is carried out during the stop mode, so as to eject the tape cassette 18 out from the apparatus 10. In this case, the pinch roller 17 separates from the capstan 52, and the apparatus 10 carries out the so-called unloading operation.

Further, the present invention is not limited to these embodiments, but various variations and modifications can be made without departing from the scope of the present invention.

What is claimed is:

1. A display device for a magnetic tape recording and/or reproducing apparatus, said recording and/or reproducing apparatus having a pinch roller and a capstan to receive and drive a magnetic tape, said display device comprising:

pulse generating means for generating pulse signals having a frequency which corresponds to a rotatinal speed of said capstan;

counter means responsive to said pulse generating means for counting the pulse signals from said pulse generating means to give a real-time readout;

indicator means responsive to said counter means for displaying a real-time display corresponding to the counted result; and interrupting means responsive to a stopping of tape travel for interrupting said counter means to stop the counting of the pulse signals from said pulse generating means;

said indicator means displaying in real-time, a quantity of tape travel as said magnetic tape is driven responsive to said capstan.

2. A display device as claimed in claim 1 in which said counter means comprises a frequency divider for frequency-dividing the pulse signal from said pulse generating means, and a counter for counting an output signal of said frequency divider and for producing a counted result which changes its value in correspondence with real-time.

3. A display device as claimed in claim 2 in which said counter counts down the output signal of said frequency divider, and supplies to said indicator means an output signal indicative of a counted result which changes for every one second.

4. A display device as claimed in claim 1 in which said recording and/or reproducing apparatus further comprises a capstan motor for rotating said capstan, and a capstan servo loop for controlling the rotation of said capstan motor, and said pulse signal from said pulse generating means is also supplied to said capstan servo loop.

5. A display device as claimed in claim 1 in which said magnetic tape has transparent tapes respectively connected to both ends thereof, and said interrupting means comprises detecting means for detecting that one of said transparent tapes has reached a predetermined position due to travel of said magnetic tape, and gate means for substantially interrupting the supply of said pulse signal to said counter means according to a detected result in said detecting means.

6. A display device as claimed in claim 5 in which said interrupting means further comprises a voltage source, said detecting means comprises a light source and phototransistors which respectively have emitters grounded and respectively turn ON upon receipt of a light emitted by said light source, and said gate means comprises a NAND gate which has one input terminal coupled to the output of said pulse generating means and another input terminal coupled to collectors of said phototransistors and to said power source.

7. A display device as claimed in claim 1 in which said interrupting means comprises a power source, a transistor which has a grounded emitter and turns ON when said magnetic tape stops traveling, and a NAND gate which has one input terminal coupled to the output of said pulse generating means and another input terminal coupled to a collector of said transistor and to said power source.

8. A display device as claimed in claim 1 in which said recording and/or reproducing apparatus further comprises means for keeping said pinch roller pressed against said capstan even during a fast-forward mode in which said magnetic tape travels at a high speed in a forward direction or a rewind mode in which said magnetic tape travels at a high speed in a reverse direction, and means for rotating said capstan at a high speed in a forward direction or a reverse direction during said fast-forward mode or said rewind mode, and said indicator means displays the tape travel quantity of said magnetic tape in real-time even during said fast-forward or said rewind mode.

* * * * *